Nov. 12, 1929.   J. A. WRIGHT   1,735,708
FRONT AXLE ASSEMBLY
Filed Dec. 8, 1927   2 Sheets-Sheet 1

Fig I

INVENTOR.
JAMES A. WRIGHT.
By
ATTORNEY.

Nov. 12, 1929.    J. A. WRIGHT    1,735,708
FRONT AXLE ASSEMBLY
Filed Dec. 8, 1927    2 Sheets-Sheet 2

INVENTOR.
JAMES A. WRIGHT.
By
ATTORNEY.

Patented Nov. 12, 1929

1,735,708

UNITED STATES PATENT OFFICE

JAMES A. WRIGHT, OF MONTREAL, QUEBEC, CANADA

FRONT-AXLE ASSEMBLY

Application filed December 8, 1927. Serial No. 238,683.

This invention relates to motor vehicles and particularly to the front axle assembly and suspension of vehicles of the truck type.

The object of my invention is to provide a front axle assembly of strong and durable design to meet the specially strenuous requirements of vehicles of this type.

A further object is to provide a wheel carrier of novel form in which the ends of the springs of the transverse suspension are housed in rubber blocks.

Further objects will be set forth hereinafter.

Reference is made to the accompanying drawings, in which:—

Figure 1:
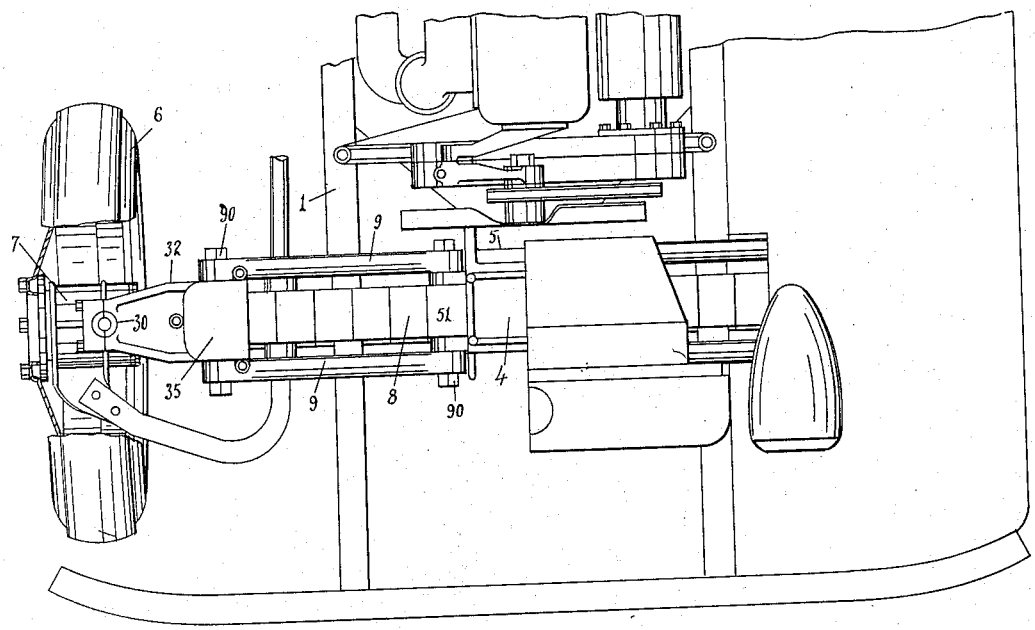
Fig. 1 is a plan view.
Figure 2:
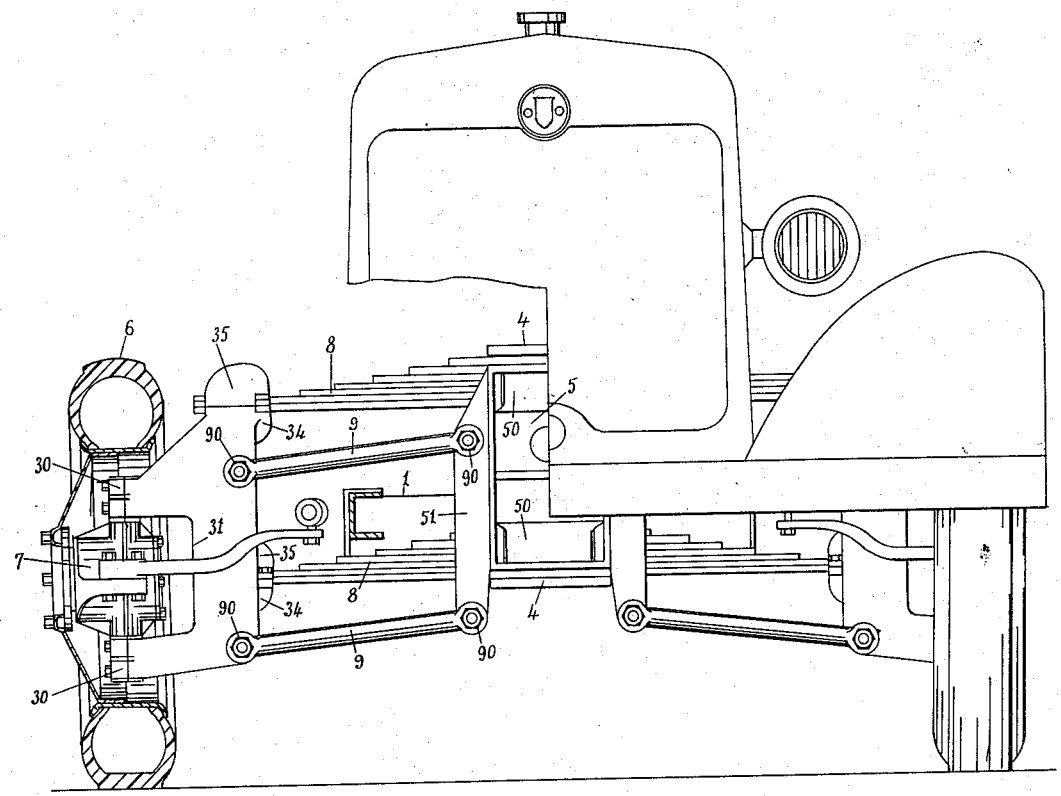
Fig. 2 is a front view partly cut away.
Figure 3:
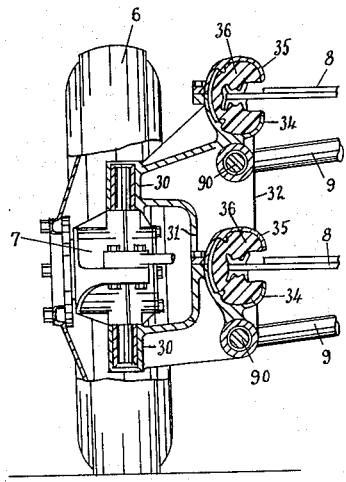
Fig. 3 is a vertical section of the wheel carrier.
Figure 4:
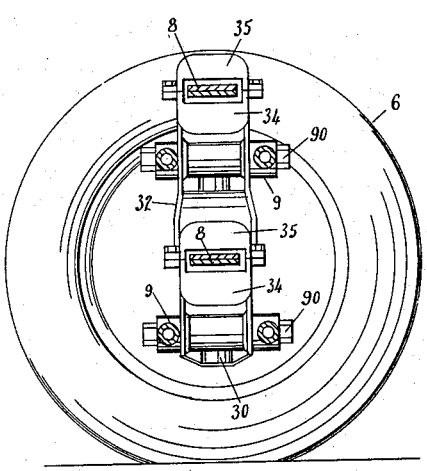
Fig. 4 is a view on the line 4—4 of Fig. 3, looking outwards.

The front yoke block 5, which is secured to the frame 1, provides upper and lower transverse seats 50, in which the springs 8, are anchored by the anchor plates 4.

At each side of the yoke block 5, are vertical ribs 51, which project outwardly on each side of the springs 8.

Bolts 90, through these ribs 51, below each spring 8, provide pivots for the radius rods 9.

The wheel carrier 3, comprises side plates 32, forming a vertical channel in which are integral upper and lower cups 34, with removable covers 35.

These cups 34, contain rubber blocks 36, in which the ends of the springs 8, are housed, while the radius rods 9, are pivoted on the bolts 90, below each cup 34.

The wheel carrier 3, has upper and lower outward projections which terminate in vertical bearings 30, forming an arch 31, about the sleeve bearing 7, of the wheel 6.

The sleeve bearing 7, is vertically pivoted in the upper and lower vertical bearings 30, of the wheel carrier 3.

The wheel 6, is journalled in the sleeve 7.

The radius rods 9, shown on the outside of the channel 32, and the ribs 51, may be replaced by single rods 9, of heavy construction, pivoted between the side plates 32, of the channels and the ribs 51, respectively.

With the foregoing form of construction, the truck frame at its front end is suspended through transverse springs on the front wheels, through wheel carriers maintained in their true position relative to the car body by means of a set of radius rods. The wheels which are journalled in the sleeves vertically pivoted to the wheel carriers, are controlled by the usual steering levers.

The spring terminals housed in the rubber blocks in the cups integral with the side plates of the wheel carriers are firmly held, and assist in maintaining the wheel carriers in their true position under any flexure of the springs, or effect of uneven roadway.

What I claim is:—

1. In a device of the class specified, a front wheel carrier comprising upper and lower vertical bearings forming an arched outward extension, side plates forming a vertical channel, upper and lower integral cups between the side plates, removable covers to the cups and transverse bolts below each cup adapted to provide pivots for radius rods.

2. In a front axle transverse spring suspension, a wheel carrier comprising upper and lower vertical bearings forming arched outward extensions, side plates forming a vertical channel, upper and lower integral cups between the side plates, removable covers to the cups, blocks of resilient material within the cups in which the ends of the transverse springs are mounted.

3. In a front axle transverse spring suspension, a wheel carrier comprising upper and lower vertical bearings forming arched outward extensions, side plates forming a vertical channel, upper and lower integral cups between the side plates, removable covers to the cups, blocks of resilient material within the cups in which the ends of the transverse springs are mounted, and radius rods horizontally pivoted to the side plates beneath the cups, adapted to retain the wheel carrier in position.

JAMES A. WRIGHT.